United States Patent [19]
Sayres

[11] Patent Number: 5,451,115
[45] Date of Patent: Sep. 19, 1995

[54] PREFABRICATED CORNER JOINT FOR A FRAMEWORK COMPRISING TUBULAR MEMBERS

[76] Inventor: David W. Sayres, 23 Everett Dr., Newtown, Pa. 18940

[21] Appl. No.: 138,197

[22] Filed: Oct. 20, 1993

[51] Int. Cl.6 .............................................. F16B 2/22
[52] U.S. Cl. .................... 403/171; 403/176; 403/217; 403/372
[58] Field of Search ........................ 403/169–172, 403/174–176, 178, 217, 295, 367, 372

[56] References Cited

U.S. PATENT DOCUMENTS

| | | | |
|---|---|---|---|
| 2,281,220 | 4/1942 | Anderson | 287/54 |
| 3,542,407 | 11/1970 | Brown | 403/174 X |
| 3,645,569 | 2/1992 | Reilly | 403/406.1 X |
| 3,666,298 | 5/1992 | Reilly | 403/172 |
| 3,893,774 | 7/1975 | Hashioka | 403/171 |
| 4,076,432 | 2/1978 | Glaser | 403/176 |
| 4,630,550 | 12/1986 | Weitzman | 108/155 |

FOREIGN PATENT DOCUMENTS

| | | | |
|---|---|---|---|
| 344120 | 11/1989 | European Pat. Off. | 403/171 |
| 2599095 | 11/1987 | France | 403/172 |
| 2667656 | 4/1992 | France | 403/170 |
| 1008031 | 10/1965 | United Kingdom | 403/176 |

OTHER PUBLICATIONS

Brochure entitled "EZ Tube Boltless Construction System" 4 pages, undated, by International Designs Limited, 70 Commerce Drive, Warminster, Pa.

*Primary Examiner*—Randolph A. Reese
*Assistant Examiner*—Harry C. Kim
*Attorney, Agent, or Firm*—William Freedman

[57] ABSTRACT

This corner joint, which serves to connect together a plurality of hollow frame members, comprises a metal trunk member containing a plurality of holes and a plurality of metal posts mounted on and projecting from the trunk member. Each post has an inner end fitting in one of the holes, an externally-threaded outer end, and a body portion between the two ends having a non-circular outer periphery. A plurality of hollow plastic sleeves respectively fit over the outer peripheries of the body portions of the posts. Each sleeve has an inner periphery of approximately the same shape and size as the outer periphery of the associated post body portion. Retaining nuts respectively mounted on the outer ends of the posts receive the externally-threaded outer ends of the posts.

The plastic sleeve on each post is mounted for axial slidable motion on the post body portion but is fixed between the associated retaining nut and the trunk member when the nut is fully tightened, thereby blocking axial sliding motion of the sleeve on the post body when the nut is fully tightened. Each of the plastic sleeves has an outer periphery that is adapted to fit snugly within one of the hollow frame members.

5 Claims, 2 Drawing Sheets

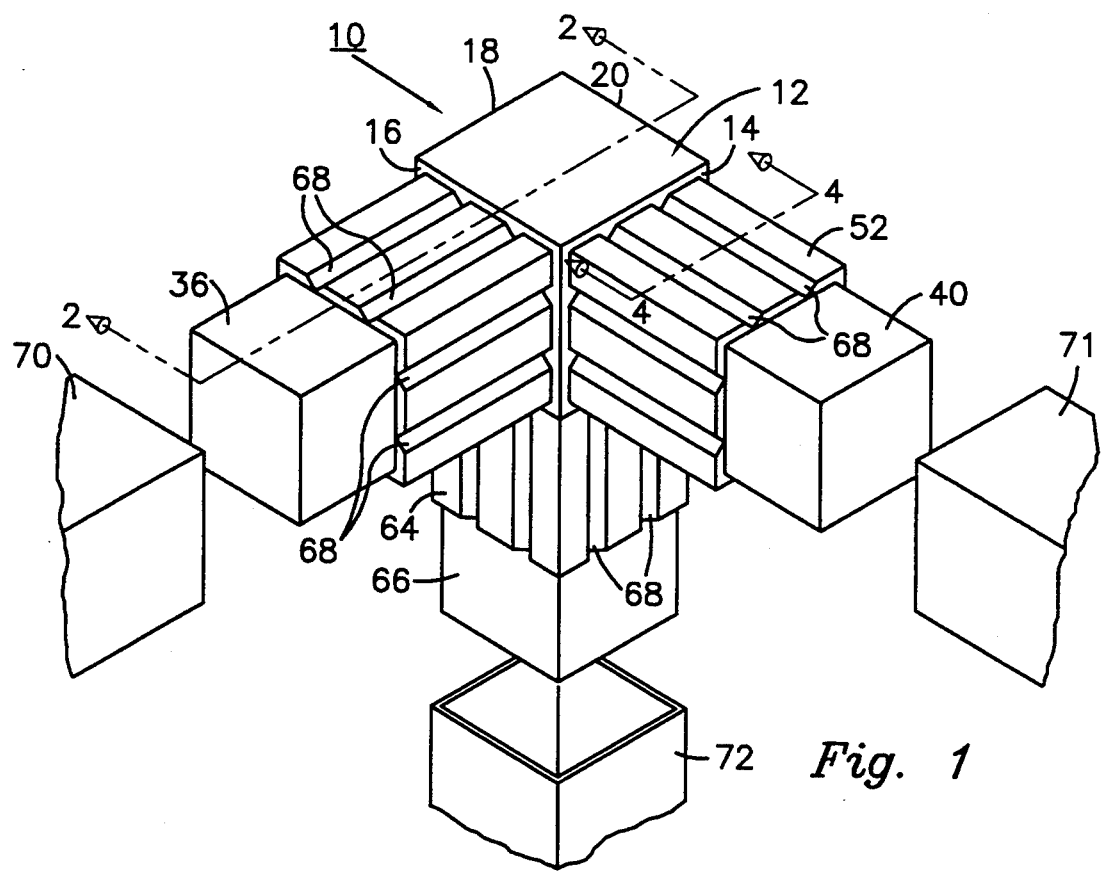
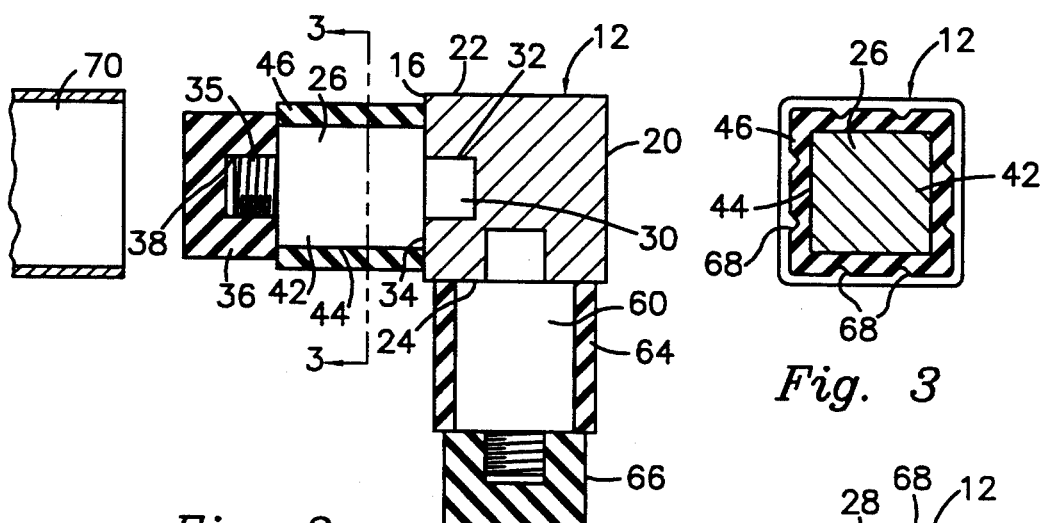
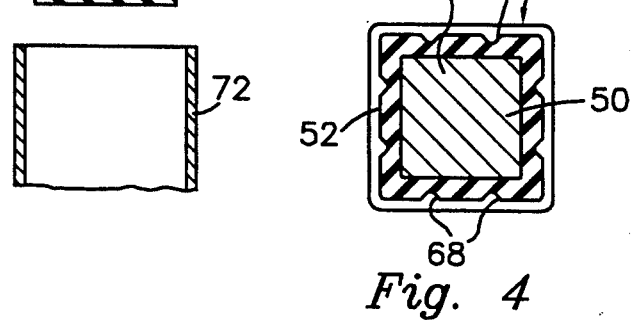

PREFABRICATED CORNER JOINT FOR A FRAMEWORK COMPRISING TUBULAR MEMBERS

FIELD OF THE INVENTION

This invention relates to a prefabricated corner joint for use in a framework comprising tubular components connected together by the corner joint.

BACKGROUND

The type of corner joint that I am concerned with comprises a metal core having projecting arms that are covered by a layer of plastic material. These plastic-covered arms fit tightly into tubular metal components, thus forming a framework portion in which the tubular components are connected together through the corner joint. The metal core imparts mechanical strength to the corner joint, and the plastic covering enables a tight fit to be developed between the corner joint and the tubular metal components when the tubular components are pushed onto the arms of the corner joint during assembly of the framework.

Prior designs of these corner joints have not been as rigid and sturdy as is sometimes desired. Another problem with prior designs is that the plastic covering cannot readily be replaced should it become damaged as a result of abrasion, cutting, or deformation during assembly or disassembly of the framework. Such damage can interfere with reassembly of the framework and with achieving the desired tight fit with the tubular metal components upon reassembly.

OBJECTS

An object of my invention is to provide a corner joint of this general type which is inexpensive and is exceptionally sturdy and rigid, even after disassembly and reassembly of the framework containing the corner joint.

Another object is to construct the corner joint in such a manner that the portions of the plastic cover that fit within the tubular metal components can be easily replaced should they become damaged.

SUMMARY

In carrying out my invention in one form, I provide a corner joint for a framework that comprises a plurality of hollow metal frame members that are connected together by said corner joint. The corner joint comprises a metal trunk member containing a plurality of holes and a plurality of metal posts mounted on and projected from the trunk member. Each post has an inner end fitting in one of the holes in the trunk member, an externally-threaded outer end, and a body portion located between the two ends having a non-circular outer periphery. The corner joint further comprises a plurality of hollow plastic sleeves respectively fitting over the outer peripheries of the body portions of the posts. Each sleeve has an inner periphery of approximately the same shape and size as the outer periphery of the post body portion that carries the sleeve. A plurality of retaining nuts respectively mounted on the outer ends of the posts have internally-threaded bores for receiving the externally-threaded outer ends of the associated posts. The plastic sleeve on each post is mounted for axially-directed slidable motion on the post body portion but is fixed between the associated retaining nut and the trunk member when the nut is fully tightened, thereby blocking axial sliding motion of the sleeve on the post body when the nut is fully tightened. Each of the plastic sleeves has an outer periphery that is adapted to fit snugly within one of hollow metal-frame members.

Should the plastic sleeve on one of the posts require replacement, this can be easily accomplished by removing the associated retaining nut, sliding the sleeve off the body portion of the post, sliding on a replacement sleeve, and reapplying the retaining nut.

BRIEF DESCRIPTION OF FIGURES

For a better understanding of the invention, reference may be had to the following detailed description taken in conjunction with the accompanying drawings, in which.

FIG. 1 is a perspective view of a corner joint embodying one form of my invention.

FIG. 2 is a sectional view taken along the line 2—2 of FIG. 1.

FIG. 3 is a sectional view taken along the line 3—3 of FIG. 2.

FIG. 4 is a sectional view taken along the line 4—4 of FIG. 1.

DETAILED DESCRIPTION OF EMBODIMENTS

Figure 5:
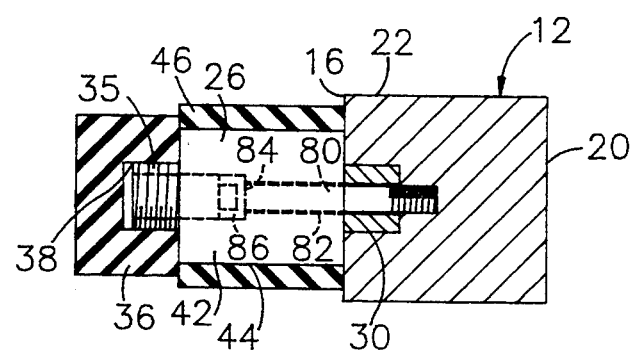
FIG. 5 is a sectional view of a portion of a modified embodiment of the invention taken along a line corresponding to 2—2 in FIG. 1.

Referring now to the drawings, the illustrated corner joint 10 comprises a centrally-located trunk member 12 of a suitable metal, such as aluminum or stainless steel. This trunk member 12 is in the form of a rectangular block having six planar faces, four at its sides, one at its top, and one at its bottom. The sides faces are respectively designated 14, 16, 18, and 20, the top face 22, and the bottom face 24.

Projecting laterally from the side faces 16 and 14, respectively, of the trunk member are two metal posts 26 and 28, preferably of the same metal as the trunk member. Each of these posts is fixed to the trunk member by means of a reduced diameter extension at the inner end of the post that fits tightly into a hole in the trunk member. The inner extension of post 26 is shown at 30 in FIG. 2 fitting in a hole 32 in the trunk member. Preferably, a good adhesive is applied between the extension 30 and the hole 32 to prevent removal of the post and to assure a tight fit between the extension and the surrounding hole. The other post 28 is fixed to the trunk member 12 in essentially the same manner. Each of the posts has a flat inner face such as 34 in FIG. 2 that abuts evenly against the adjoining lateral surface of the trunk member 12 to further assure against loosening of the post with respect to the trunk member.

Each of the posts 26 and 28 further comprises an extension at its outer end that is externally threaded and adapted to receive a retaining nut having an internally-threaded bore mating with the external threads on the extension. For example, as shown in FIG. 2, post 26 has an externally-threaded extension 35 at its outer end that receives a nut 36 having an internally-threaded bore 38. The other post 28 is identically constructed and is adapted to receive a nut 40 identical to nut 36. These nuts are preferably of a plastic material and have threads that mesh tightly with those on the extensions (e.g., 35) so that they remain tight without need for any supplemental locking or retention means.

The post 26 further comprises a body portion 42 between its inner and outer ends. This body portion 42 has an outer periphery 44 of uniform transverse cross-section, non-circular, and preferably substantially square in configuration, as shown in FIG. 3. Surrounding this outer periphery is a hollow plastic sleeve 46 that has an inner periphery of essentially the same size and shape as the outer periphery 44 of the body portion 42. This plastic sleeve 46 fits snugly about the outer periphery 44 but can be slid by hand axially onto and off of the outer periphery when the retaining nut 36 is not in place. When the retaining nut 36 is in place and fully tightened, its inner face abuts the outer end of the plastic sleeve 46, trapping the sleeve between the nut 36 and the trunk member 12 and, thus, preventing axial sliding movement of the sleeve on the body portion 42 of post 26.

The other post 28 has a body portion 50 of uniform, substantially square cross-section that is identical to the body portion of the previously-described post 26. This body portion of post 28 is surrounded by a hollow plastic sleeve 52 that is identical to the sleeve 46 on post 26. Sleeve 52 is slidable on post 28 but is held in place by a retaining nut 40 (FIG. 1) corresponding to the above-described retaining nut 36.

The embodiment of FIGS. 1–4, in addition to having the two posts 26 and 28 projecting horizontally from the trunk member 12, includes a third post 60 of identical construction projecting vertically from the bottom face 24 of the trunk member. This third post 60 is fixed to the trunk member in the same manner as the other two posts and is surrounded by a plastic sleeve 64 that is identical to the other two plastic sleeves 46 and 52. A retaining nut 66, corresponding to the other retaining nuts 36 and 40, is threaded onto the outer end of the post 60 and acts in the same manner as the other nuts to hold its associated plastic sleeve 64 in place.

The combination of each post and its plastic sleeve and the retaining nut thereon is sometimes referred to herein as an "arm" of the corner joint.

The outer periphery of each sleeve 46 and 52 is of substantially uniform cross-sectional shape at all locations along its length. This cross-sectional shape is substantially square so as to enable the sleeve to fit tightly into a hollow metal framework member having a matching square inner peripheral configuration, as will soon be described in more detail. To enable the sleeve to yield slightly when compressed by the surrounding hollow member, the sleeve includes on each of its outer faces a plurality of V-shaped grooves 68 extending axially of the sleeve.

As noted hereinabove, the corner joint of this application is a prefabricated component that is utilized for constructing a framework or the like that comprises hollow tubular members that are connected together by such corner joints. Referring to FIGS. 1 and 2, three such hollow members are partially shown at 70, 71 and 72. Each of these hollow members is preferably a thin-walled metal extrusion of uniform transverse cross-section, substantially square in form.

In constructing a framework from these components, the hollow extrusions are forced onto the projecting arms of the corner joint. More specifically, each extrusion is forced in an axial direction over an associated one of the plastic sleeves. For example, the extrusion 70 of FIGS. 1 and 2 is forced axially over the plastic sleeve 46 until the inner end of the extrusion abuts the lateral face 16 of the trunk member 12.

The inner periphery of each extrusion is of substantially the same size and shape as the outer periphery of the plastic sleeves 26, 52, and 64 of the corner joint 10 (except for the grooves 68 that are present on the outer periphery of the plastic sleeves). As a result, the extrusion fits tightly about its associated plastic sleeve when the extrusion is forced axially over the sleeve into its fully assembled position. As mentioned hereinabove, the grooves 68 on the plastic sleeve allow the plastic sleeve to yield slightly when the extrusion is pushed over the sleeve during assembly.

For various reasons, it is sometimes necessary to disassemble the framework, or at least a portion of the framework. As part of such disassembly, it may be necessary to pull one or more of the extrusions 70, 71, 72 off of the plastic sleeve 46, 52, or 64 on which the extrusion is mounted and to replace the extrusion with a new one. I have found that, typically, in such situations, the new extrusion does not fit the original plastic sleeve with the desired degree of tightness. The usual reason for this is that the plastic sleeve has been damaged (e.g., abraded, cut, or deformed) by contact with the extrusion when the extrusion is forced on and off the sleeve during assembly and disassembly.

I am able to readily overcome this problem without the need for replacing the entire corner joint. More specifically, I replace the damaged plastic sleeve with a new one, simply by unscrewing the retaining nut (e.g., 36), sliding the damaged sleeve (46) off of the post body (26), sliding a new sleeve into position over the post body, and then reapplying the retaining nut. If any of the other plastic sleeves has been damaged, a corresponding sleeve-replacement operation is performed where needed. This restores the corner joint 10 to its original condition in preparation for reassembly of the framework.

While I have illustrated a corner joint with three arms projecting from the trunk member 12, it is to be understood that fewer or more arms can be present, as may be required to adapt the corner joint for other corner configurations. For example, from any of the surfaces 14, 16, 18, 20, 22, or 24 of the trunk member 12 an arm, identical in construction to each of the illustrated arms, can project.

Over the plastic sleeve of any such arm a hollow extrusion can be tightly fitted in the same manner as above described to secure the extrusion to the corner joint. In each of these corner joints, each arm is preferably connected to the trunk member 12 in the same manner as illustrated, i.e., with an extension on the inner end of the metal post of the arm fitting into an appropriately-located hole in the trunk member and suitable adhesive between the hole and the extension.

Framework corners constructed with my illustrated corner joint have been found to be exceptionally sturdy and rigid. Features contributing to this sturdiness and rigidity are the presence of the mechanically-strong metal core made up of the trunk member 12 and the projecting metal posts 26, 28, and 60, the fact that the plastic sleeves fit tightly on the metal posts and tightly within the tubular metal extrusions, and the fact that I can always employ within each tubular extrusion a plastic sleeve that has not been damaged by prior disassembly of the framework.

To facilitate fitting of the plastic sleeves onto their respective posts, the inner corners of the sleeves and the outer corners of the posts are preferably rounded, using a small radius of curvature for each corner. Similarly, the outer corners of the plastic sleeves are rounded, using a small radius of curvature, to facilitate fitting of the plastic sleeves into their respective extrusions 70, 71, and 72.

FIG. 5 illustrates a modified form of the invention in which supplemental fastening means is provided to assure against unintentional loosening or detachment of the post 26 from the trunk member 12. This supplemental fastening means comprises a socket-headed cap-screw 80 that extends through a closely-fitting bore 82 in the post 26 and is threaded at its inner end into an internally-threaded blind hole in the trunk member 12. The bore 82 has a shoulder 84 against which the head 86 of the cap-screw abuts when the cap-screw is fully tightened. This abutting relationship prevents the post 26 from being pulled out of the trunk member 12 unless the cap-screw is loosened. Tightening of the cap-screw is effected with a suitably-shaped wrench (not shown) applied to the socket in the head 86 of the screw. It is to be understood that each of the posts can be provided with corresponding supplemental fastening means to assure against unintentional loosening or detachment of the post from the trunk member 12.

In the above-described embodiments the plastic sleeves can be of any suitable conventional resin, e.g., an ABS, or acrylonitrile-butadiene-styrene, resin.

While I have shown and described particular embodiments of my invention, it will be apparent to those skilled in the art that various changes and modifications may be made without departing from our invention in its broader aspects; I, therefore, intend herein to cover all such changes and modifications as fall within the true spirit and scope of my invention.

What I claim as new is:

1. A corner joint for a framework that comprises a plurality of hollow metal frame members that are connected together by said joint, the joint comprising:
    (a) a metal trunk member of block form containing a plurality of laterally-extending holes,
    (b) a plurality of metal posts fixed to and projecting laterally from said trunk member, each post having an inner end fitting in one of said holes, an externally-threaded outer end, and a body portion between said ends having a non-circular outer periphery,
    (c) a plurality of hollow plastic sleeves respectively fitting over the outer peripheries of the body portions of said posts, each sleeve having an inner periphery that is of approximately the same shape and size as the outer periphery of the post body portion on which the sleeve fits,
    (d) a plurality of nuts respectively mounted on the outer ends of said posts, each nut having an internally-threaded bore for receiving the externally-threaded outer end of the post on which said nut is mounted,
    (e) fastening means extending axially of said each metal post and into the associated hole in said trunk member, said fastening means having an inner end with external threads meshing with internal threads on said trunk member for securing said each post to said trunk member, the joint being further characterized by:
    (f) the plastic sleeve on said each post being mounted for axially-directed slidable motion on said post body portion but being fixed between tile nut on said each post and said trunk member when the nut is fully tightened, thereby blocking axial sliding motion of said sleeve on said post body portion when said nut is fully tightened, and
    (g) said each plastic sleeve having an outer periphery that is adapted to fit snugly within one of said hollow metal frame members.

2. A corner joint as defined in claim 1 and further comprising:
    (a) an additional metal post fixed to and projecting from said trunk member; said additional post projecting from the trunk member in a direction substantially perpendicular to the direction that one of the other posts projects; said additional post having an inner end fitting in a hole within said trunk member, an externally-threaded outer end, and a body portion between said ends having a non-circular outer periphery,
    (b) an additional plastic sleeve fitting over the outer periphery of the body portion of said additional post, said additional plastic sleeve having an inner periphery of approximately the same shape and size as the outer periphery of said additional post body portion,
    (c) an additional nut mounted on the outer end of said additional post and having an internally-threaded bore for receiving the externally-threaded outer end of said additional post, the joint being further characterized by:
    (d) the additional sleeve being mounted for axially-directed slidable motion on the body portion of said additional post but being fixed between said additional nut and said trunk member when the additional nut is fully tightened, thereby blocking axial sliding motion of said additional sleeve on said additional post body portion when said additional nut is fully tightened, and
    (e) said additional plastic sleeve having an outer periphery that is adapted to fit snugly within another hollow frame member that forms a part of said framework.

3. The corner joint of claim 1 in which the body portion of said each post is of a substantially square transverse cross-section and the outer periphery of said each plastic sleeve is of a substantially square configuration in transverse cross-section, thus adapting the plastic sleeve to fit tightly into said hollow frame member of square cross-section of substantially the same size as the outer periphery of the plastic sleeve.

4. The corner joint of claim 3 in which said each plastic sleeve contains in its outer periphery spaced-apart grooves that extend longitudinally of the plastic sleeve and allow the sleeve to yield slightly when said outer periphery enters the associated hollow frame member during assembly of said framework.

5. The corner joint of claim 1 in which said fastening means comprises a screw extending through a bore in said each post and having a head that abuts against a portion of said post when said each screw is tightened.

* * * * *